United States Patent

Noboryu et al.

[11] Patent Number: 5,949,628
[45] Date of Patent: Sep. 7, 1999

[54] MAGNETIC HEAD INCLUDING MAGNETIC CORE ACCOMMODATED IN SHIELDING CASE

[75] Inventors: Koji Noboryu; Tetsuo Shimizu, both of Saitama-ken, Japan

[73] Assignee: Canon Denshi Kabushiki Kaisha, Saitama-ken, Japan

[21] Appl. No.: 08/796,596

[22] Filed: Feb. 7, 1997

Related U.S. Application Data

[63] Continuation of application No. 08/316,648, Sep. 30, 1994, abandoned.

[30] Foreign Application Priority Data

| Oct. 5, 1993 | [JP] | Japan | 5-054047 |
| Oct. 22, 1993 | [JP] | Japan | 5-264930 |
| Oct. 28, 1993 | [JP] | Japan | 5-270464 |

[51] Int. Cl.⁶ .................................................. G11B 5/11
[52] U.S. Cl. ........................................................ 360/128
[58] Field of Search ........................... 360/128, 129, 360/125, 124, 122, 115

[56] References Cited

U.S. PATENT DOCUMENTS

| 2,662,120 | 12/1953 | Anderson | 360/128 |
| 3,938,193 | 2/1976 | Sargunar | 360/128 |
| 3,969,771 | 7/1976 | Suzuki et al. | 360/124 |
| 4,012,783 | 3/1977 | Hanaoka | 360/128 |
| 4,245,268 | 1/1981 | Toshimitsu | 360/124 |
| 4,380,784 | 4/1983 | Desserre et al. | 360/126 |
| 5,245,494 | 9/1993 | Hogan et al. | 360/128 |

FOREIGN PATENT DOCUMENTS

| 56-29831 | 3/1981 | Japan | 360/124 |
| 58-12118 | 1/1983 | Japan | 360/124 |
| 58-32213 | 2/1983 | Japan | 360/124 |
| 58-125215 | 7/1983 | Japan | 360/124 |

*Primary Examiner*—David L. Ometz
*Attorney, Agent, or Firm*—Robin, Blecker & Daley

[57] ABSTRACT

A magnetic head for carrying out recording or reproduction on or from a magnetic recording medium, comprises a shielding case having an opening in a sliding face for sliding contact with the magnetic recording medium, and a magnetic core having a projection provided with a magnetic gap portion, the magnetic gap portion being exposed through the opening of the shielding case. The projection of the magnetic core is formed to have an approximately trapezoidal, external shape incross section.

6 Claims, 8 Drawing Sheets

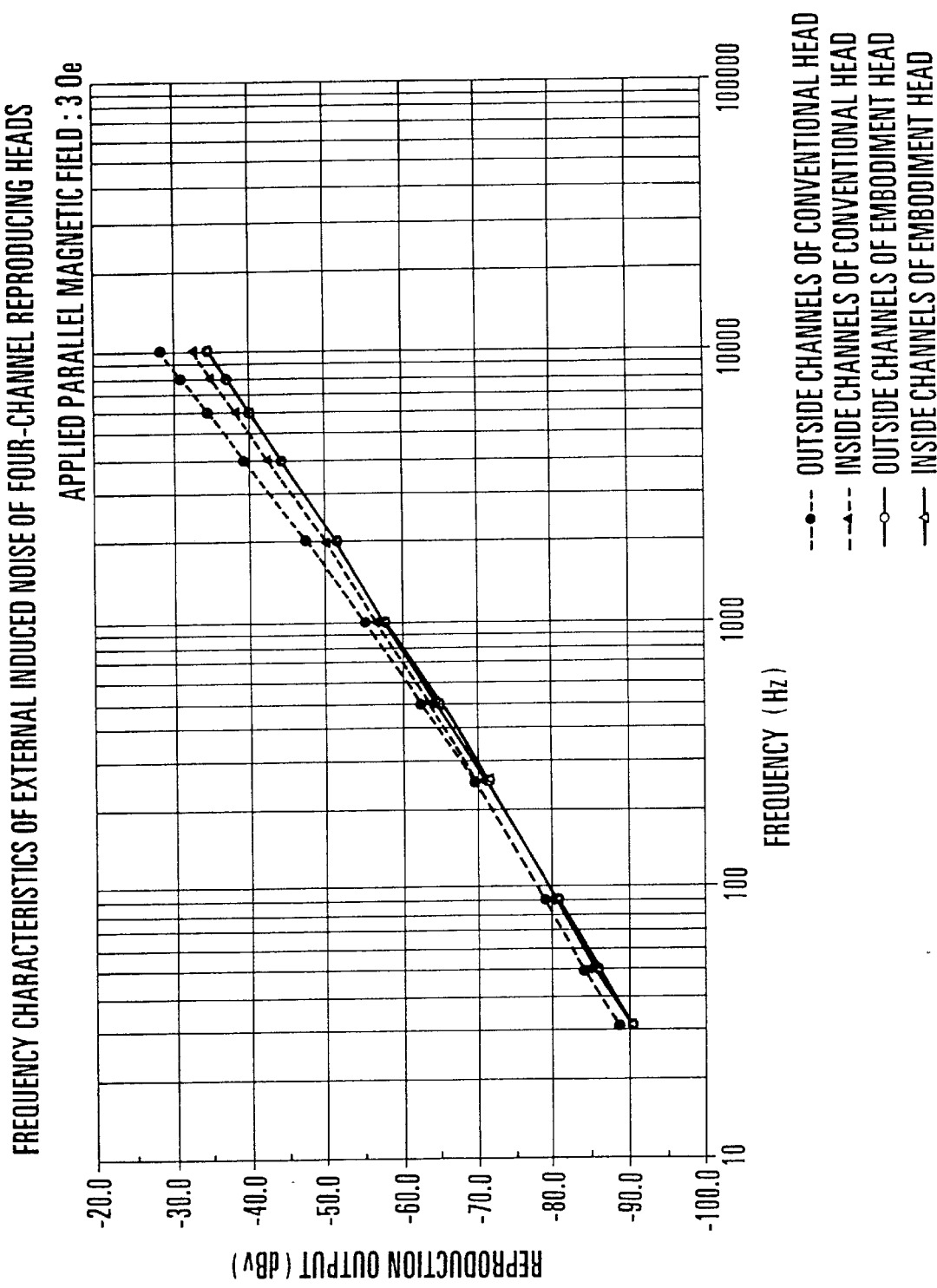

FIG.10(a)
FIG.10(b)
FIG.10(c)
FIG.10(d)
FIG.10(e)
FIG.10(f)
FIG.10(g)
FIG.10(h)
FIG.10(i)
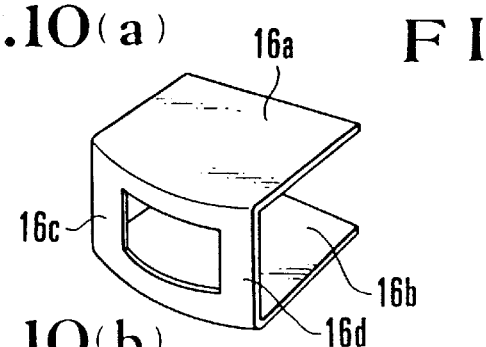
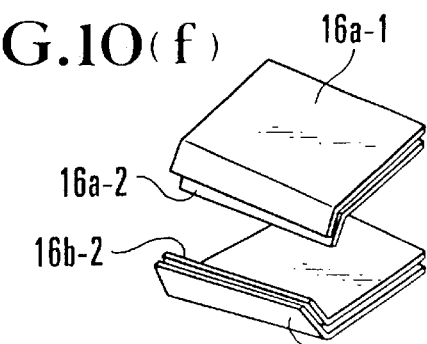
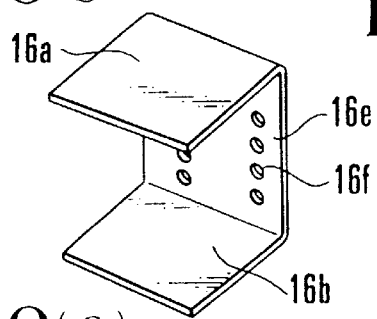
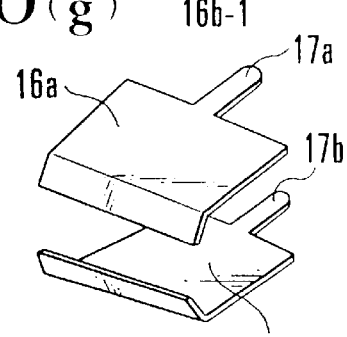
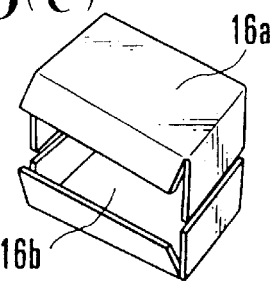
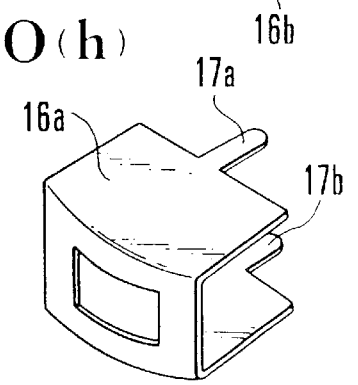
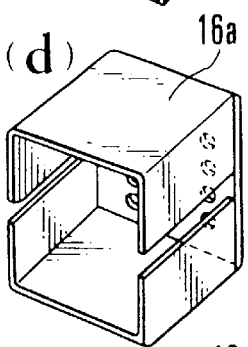
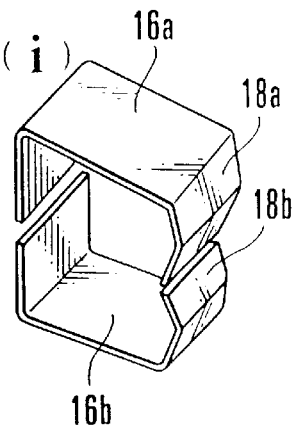
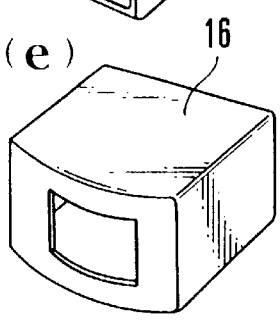

MAGNETIC HEAD INCLUDING MAGNETIC CORE ACCOMMODATED IN SHIELDING CASE

This is a continuation application under 37 CFR 1.62 of prior application Ser. No. 08/316,648, filed Sep. 30, 1994 now abandoned.

BACKGROUND OF THE INVENTION

1. Field of the Invention

The present invention relates to a magnetic head which is provided in a magnetic recording and/or reproducing apparatus and arranged to carry out recording or reproduction on or from a magnetic recording medium.

2. Description of the Related Art

FIG. 1 is a diagrammatic, cross-sectional view of a conventional magnetic head.

A magnetic core 1 is formed by a pair of magnetic core halves 1a and 1b which are butted against each other. Specifically, a non-magnetic spacer 4a is inserted into one butt portion of the magnetic core 1 to form a magnetic gap portion 4 for carrying out recording or reproduction by sliding contact with a magnetic recording medium (not shown), while a coil assembly 3 for electromagnetic conversion is fitted on the other butt portion of the magnetic core 1 in which the magnetic core halves 1a and 1b are integrally joined in an end-to-end manner.

A shielding case 5, which covers the magnetic core 1, has a square opening 5a which exposes the magnetic gap portion 4 of the magnetic core 1 to bring it into abutment with the magnetic recording medium. The shielding case 5 has the function of preventing external induced noise from conducting through the magnetic core 1 and being reproduced as noise by the coil assembly 3 for electromagnetic conversion.

The magnetic core halves 1a and 1b are fixedly held in the shielding case 5 by core holders 2a and 2b, respectively.

In order to expose the magnetic gap portion 4 through the opening 5a of the shielding case 5, the magnetic core 1 of the conventional magnetic head partly projects toward the magnetic gap portion 4 to form an arcuate, projecting external shape in cross section, as shown in FIG. 1.

However, in the conventional magnetic head, since the portion of the magnetic core 1 which is exposed through the opening 5a of the shielding case 5 has a round shape of large size, the open area of the opening 5a needs to be large, with the result that the magnetic head is greatly influenced by external induced noise and unavoidably produces noise during reproduction.

SUMMARY OF THE INVENTION

One object of the present invention is to solve the above-described problem of the related art.

Another object of the present invention is to provide a magnetic head capable of effectively preventing the influence of external induced noise.

To achieve the above objects, in accordance with one aspect of the present invention, there is provided a magnetic head for carrying out recording or reproduction on or from a magnetic recording medium, which comprises a shielding case having an opening in a sliding face for sliding contact with the magnetic recording medium, and a magnetic core having a projection provided with a magnetic gap portion, the magnetic gap portion being exposed through the opening of the shielding case, wherein the projection has a core sliding face in which the magnetic gap portion is formed and a flat face portion having an angle of inclination with respect to the core sliding face and formed to continuously extend from the core sliding face.

In accordance with another aspect of the present invention, there is provided a magnetic head for carrying out recording or reproduction on or from a magnetic recording medium, which comprises a shielding case having an opening in a sliding face for sliding contact with the magnetic recording medium, and a magnetic core having a projection provided with a magnetic gap portion, the magnetic gap portion being exposed through the opening of the shielding case, wherein the projection has an approximately trapezoidal, external shape in cross section.

In accordance with another aspect of the present invention, there is provided a magnetic head for carrying out recording or reproduction on or from a magnetic recording medium, which comprises a shielding case having an opening in a sliding face for sliding contact with the magnetic recording medium, and a magnetic core having a projection provided with a magnetic gap portion, the magnetic gap portion being exposed through the opening of the shielding case, wherein the projection has a core sliding face in which the magnetic gap portion is formed and a concave portion formed to continuously extend from the core sliding face.

In accordance with another aspect of the present invention, there is provided a magnetic head which comprises a plurality of magnetic core pieces, first magnetic shielding members respectively disposed between each of the plurality of magnetic core pieces and the adjacent one, a shielding case in which the plurality of magnetic core pieces and the first magnetic shielding members are accommodated, and second magnetic shielding members respectively disposed between one side of the shielding case and an adjacent, outermost magnetic core piece from among the plurality of magnetic core pieces and between an opposite side of the shielding case and an adjacent, outermost magnetic core piece from among the plurality of magnetic core pieces.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 9 is a graph showing external-induced-noise frequency data obtained in a case where a head having the arrangement of the embodiment shown in FIGS. 8(a) and 8(b) is applied to a four-channel reproducing head; and FIGS. 10(a) to 10(i) are views showing various kinds of arrangement examples of shielding plates used in the embodiment shown in FIGS. 8(a) and 8(b), FIG. 10(a) is a view showing an example in which the shielding plates are joined to each other on a tape running side, FIG. 10(b) is a view showing an example in which the shielding plates are joined to each other on a terminal projecting side, FIG. 10(c) is a view showing an example in which the shielding plates are extended to cover both sides of a magnetic head, FIG. 10(d) is a view showing an example in which the shielding plates are joined to each other on the terminal projecting side and extended to cover both sides of a magnetic head, FIG. 10(e) is a view showing an example in which shielding plates are formed into a shape similar to the shielding case, FIG. 10(f) is a view showing an example in which each shielding plate has a laminated structure, FIG. 10(g) is a view showing an example in which each shielding plate is partly extended to form a grounding terminal, FIG. 10(h) is a view showing an example in which each shielding plate is partly extended to form a grounding terminal, and FIG. 10(i) is a view showing an example in which each shielding plate has elasticity in part.

DETAILED DESCRIPTION OF THE PREFERRED EMBODIMENTS

Preferred embodiments of a magnetic head according to the present invention will be described below with reference to the accompanying drawings.

Figure 1:
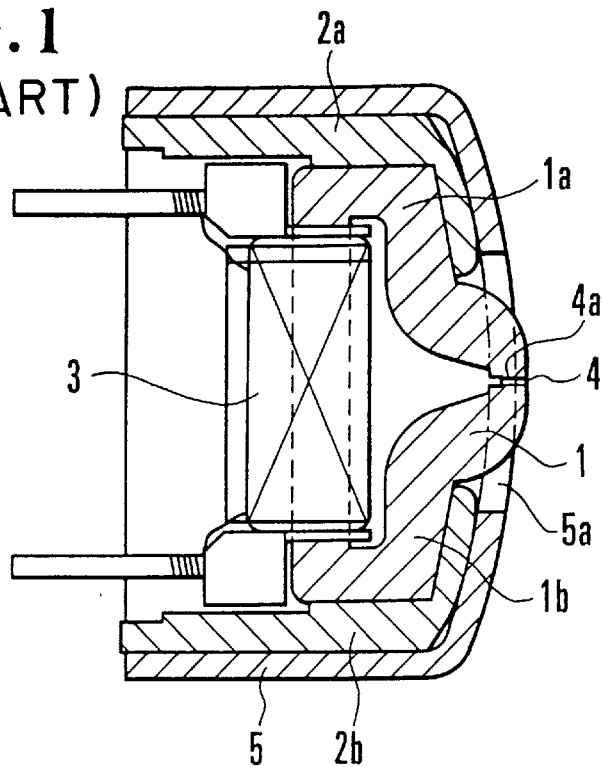
FIG. 1 is a diagrammatic, cross-sectional view showing the arrangement of a conventional magnetic head.
Figure 2:
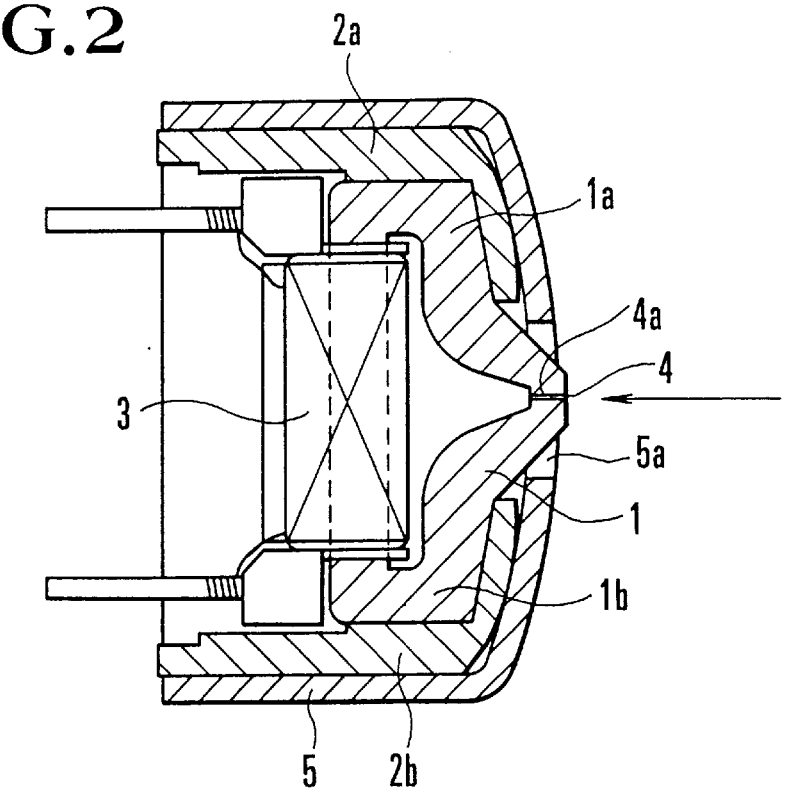
FIG. 2 is a diagrammatic, cross-sectional view showing the arrangement of one embodiment of a magnetic head according to the present invention.

FIG. 2 is a diagrammatic, cross-sectional view of one embodiment of the magnetic head according to the present invention. In FIG. 2, identical reference numerals are used to denote portions identical to or corresponding to those used in the above-described conventional example, and the description thereof is omitted.

Although the conventional magnetic core 1 partly projects toward the magnetic gap portion 4 to form the arcuate, projecting external shape in cross section, the present embodiment is characterized in that, in order to expose the magnetic gap portion 4 through the opening 5a of the shielding case 5, the outside surface portion of the magnetic core 1 which projects toward the magnetic gap portion 4 is formed by flat faces and the magnetic core halves 1a and 1b are butted against each other at the magnetic gap portion 4.

Specifically, the projecting shape of each of the magnetic core halves 1a and 1b is such that an outside surface portion formed by a flat face extends toward the magnetic gap portion 4 from a portion facing the inside of the portion of the shielding case 5 that faces the magnetic recording medium and covers the magnetic core 1, and the magnetic core halves 1a and 1b are butted against each other with the non-magnetic spacer 4a inserted between their butt ends.

Thus, the projecting portion of the magnetic core 1 is formed into an approximately triangular (trapezoidal), projecting shape, so that the open area of the opening 5a formed in the shielding case 5 to expose the magnetic gap portion 4 to the outside is smaller than what is required in the conventional example. For example, the opening of the shielding case in the conventional magnetic head has a width W (refer to FIG. 3(e)) of approximately 4 mm<W<approximately 5 mm, whereas the width according to the present embodiment is smaller than 4 mm although the present embodiment has the same overall dimensions as the conventional example.

FIGS. 3(a) to 3(e) are explanatory views showing the outline of the process of producing the above-described embodiment.

Figure 3A:
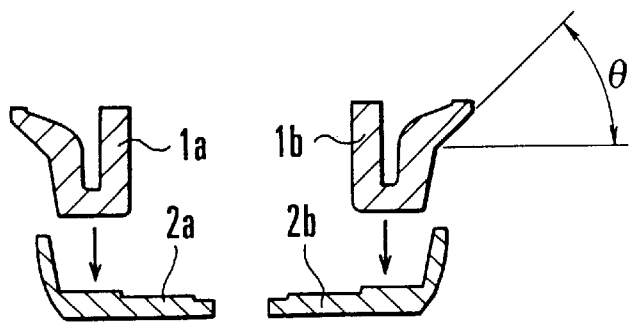
FIGS. 3(a) to 3(e) are explanatory views showing the outline of the process of producing the magnetic head shown in FIG. 2.
Figure 3B:
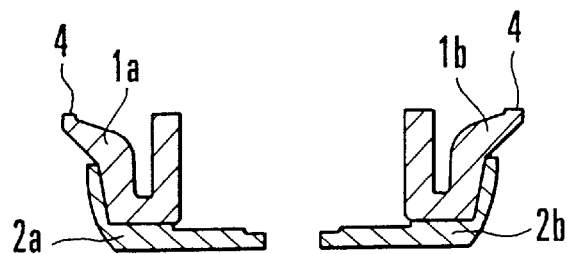

First, each of the magnetic core halves 1a and 1b is formed by laminating a plurality of materials each having a flat face which extends at an angle of inclination θ toward a portion which forms part of the magnetic gap portion 4, as shown in FIG. 3(a). Then, the magnetic core halves 1a and 1b are respectively fixed to the core holders 2a and 2b by adhesion. Then, as shown in FIG. 3(b), the portions of the magnetic core halves 1a and 1b which form part of the magnetic gap portion 4 are each finished to have a predetermined precise shape, as by grinding or polishing.

Incidentally, it is desirable that the angle of inclination θ be selected to be between 30 and 50 degrees.

Figure 3C:
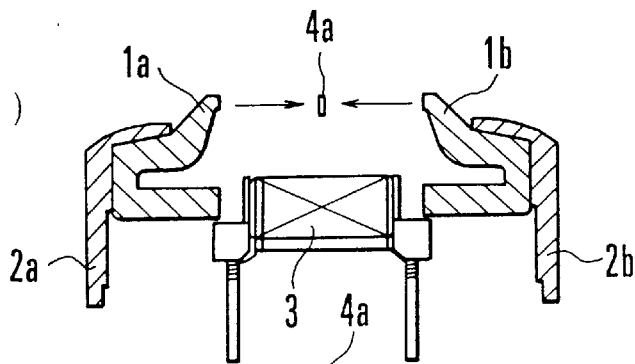
Figure 3D:
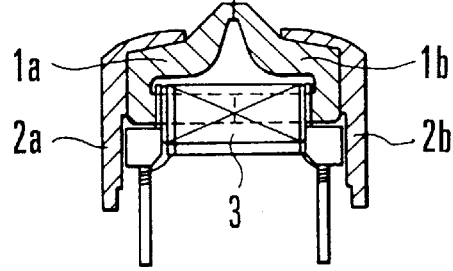

In the step shown in FIG. 3(c), the non-magnetic spacer 4a is inserted into the opposed ends of the magnetic core halves 1a and 1b on the side on which the magnetic gap portion 4 is to be formed, while the coil assembly 3 is inserted between the other opposed ends of the magnetic core halves 1a and 1b on the side on which the coil assembly 3 is to be fitted. Then, as shown in FIG. 3(d), the magnetic core halves 1a and 1b are integrally joined to form the magnetic core 1.

Figure 3E:
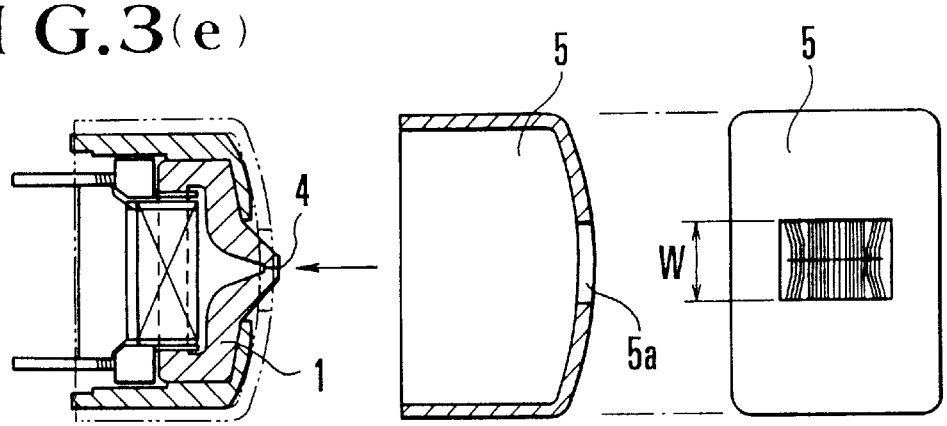

In the step shown in FIG. 3(e), the magnetic core 1 which is assembled in the aforesaid step is covered with the shielding case 5 and fixed by resin molding, and the magnetic head is completed by finishing a surface for sliding contact with a tape which serves as a recording medium.

As described above, the projecting shape of the magnetic core 1 required to expose the magnetic gap portion 4 from the shielding case 5 is an approximately triangular (trapezoidal), projecting shape which is different from the arcuate, projecting shape used in the conventional magnetic head. Accordingly, the open area of the opening 5a formed in the shielding case 5 is smaller than what is required in the conventional magnetic head, and the width W of the opening 5a is smaller than 4 mm. It is, therefore, possible to greatly improve the effect of the shielding case 5 that prevents external induced noise from conducting through the magnetic core 1 and being reproduced as noise by the coil assembly 3 for electromagnetic conversion.

In addition, since a sufficient space can be provided between the magnetic core 1 and the shielding case 5 to prevent them from coming into contact with each other, there is no risk of degrading the characteristics of the magnetic head.

Figure 4:
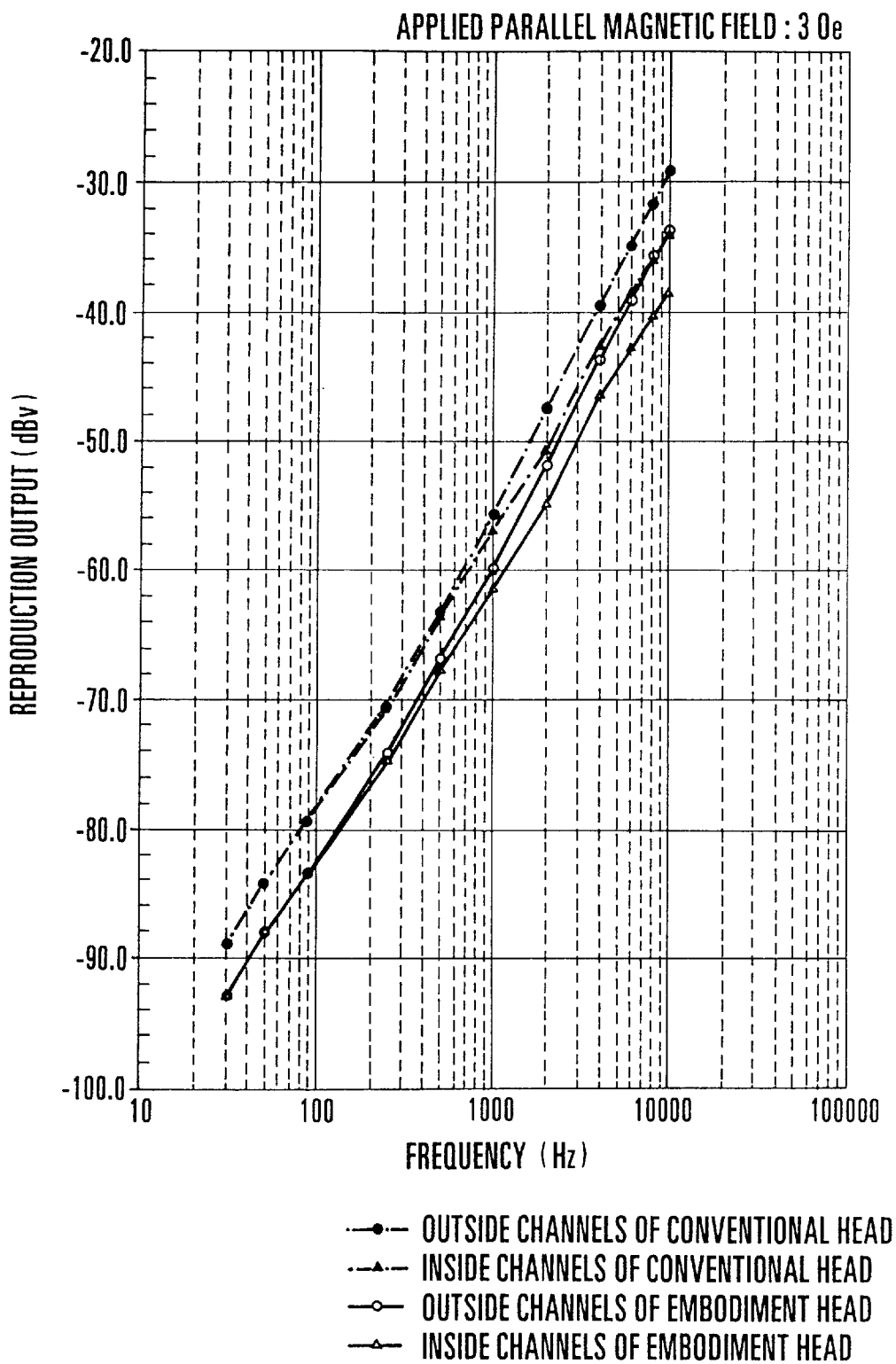
FIG. 4 is a diagram comparatively showing the performance of the magnetic head shown in FIG. 2 and the conventional magnetic head.

FIG. 4 is a reproducing-head external-induced-noise frequency characteristic chart comparatively showing the performance of a magnetic head prepared according to the aforesaid embodiment and that of a conventional magnetic head. In the magnetic head according to the aforesaid embodiment, the width W of the opening 5a formed in the shielding case 5 was 3 mm and the angle of inclination θ was 45 degrees. As can be seen from FIG. 4, the magnetic head according to the present embodiment is approximately 4 dB lower than the conventional magnetic head in external induced noise.

As is shown in FIG. 2, for example, a maximum dimension of the projection in the given movement direction of the magnetic recording medium is less than a maximum dimension of the opening in the sliding face of the shielding case in the given movement direction of the magnetic recording medium. Further indicated in FIG. 2, is that a maximum dimension of the support means opening in the given movement direction of the magnetic recording medium is greater than the maximum dimension of the opening in the sliding face of the shielding case in the given movement direction of the magnetic recording medium.

A modification of the above-described embodiment will be described below.

According to the modification, the projecting shape of the magnetic core 1 which is required to expose the magnetic gap portion 4 from the shielding case 5 is not limited to the approximately triangular, cross-sectional shape formed by the flat faces according to the above-described embodiment. For example, the magnetic core halves 1a and 1b to be butted against each other at the magnetic gap portion 4 may have inwardly curved, outside faces which form the concave shape of the projection portion of the magnetic core 1.

In this modification, the outside surface portion of each of the magnetic core halves 1a and 1b which extends toward the magnetic gap portion 4 from a portion facing the inside of the portion of the shielding case 5 that faces the magnetic recording medium and covers the magnetic core 1 has an inwardly curved or concave shape formed by an inwardly curved face or a plurality of flat faces. The magnetic core halves 1a and 1b each having such an outside surface portion are butted against each other with the non-magnetic spacer 4a inserted between their butt ends.

Figure 5A:
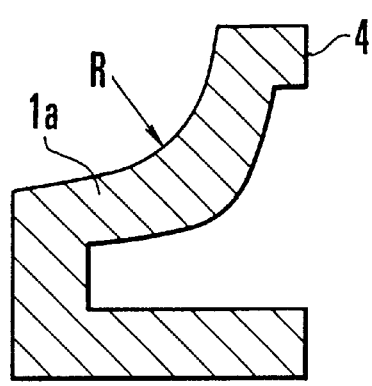
FIGS. 5(a) and 5(b) are cross-sectional views showing different cross-sectional shapes of magnetic core halves according to another embodiment of the magnetic head shown in FIG. 2.
Figure 5B:
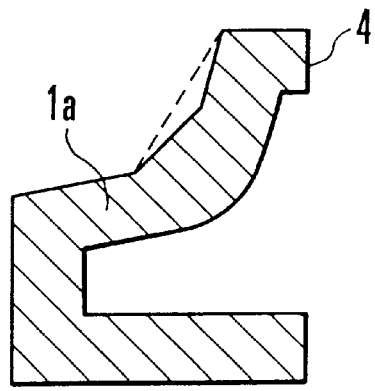

FIGS. 5(a) and 5(b) are cross-sectional views of the magnetic core halves 1a each having a different cross-sectional shape, and show the feature of the above-described modification. FIG. 5(a) shows an example in which the outside surface portion of the magnetic core half 1a is formed by an inwardly curved face of radius R, and FIG. 5(b) shows an example in which the outside surface portion of the magnetic core half 1a is formed into a concave shape by two flat faces. Incidentally, the outside surface portion of the magnetic core half 1a may be formed into a concave shape by more than two flat faces.

According to the above-described shape of the modification of the magnetic core 1, the open area of the opening 5a which is formed in the shielding case 5 to expose the magnetic gap portion 4 to the outside can easily be made far smaller than the open area of the opening 5a formed in the above-described embodiment, and it is possible to achieve an effect greater than that attainable in the above-described embodiment.

As is apparent from the above description, according to the aforesaid embodiment, it is possible to greatly improve the effect of the shielding case that prevents external induced noise from conducting through the magnetic core and being reproduced as noise by the coil assembly for electromagnetic conversion. Further, since it is possible to fully prevent the magnetic core and the shielding case from coming into contact with each other and also to prevent degradation of performance, it is possible to provide a magnetic head not as susceptible to external induced noise and having excellent performance without increasing the number of components or increasing a manufacturing cost.

Figure 6:
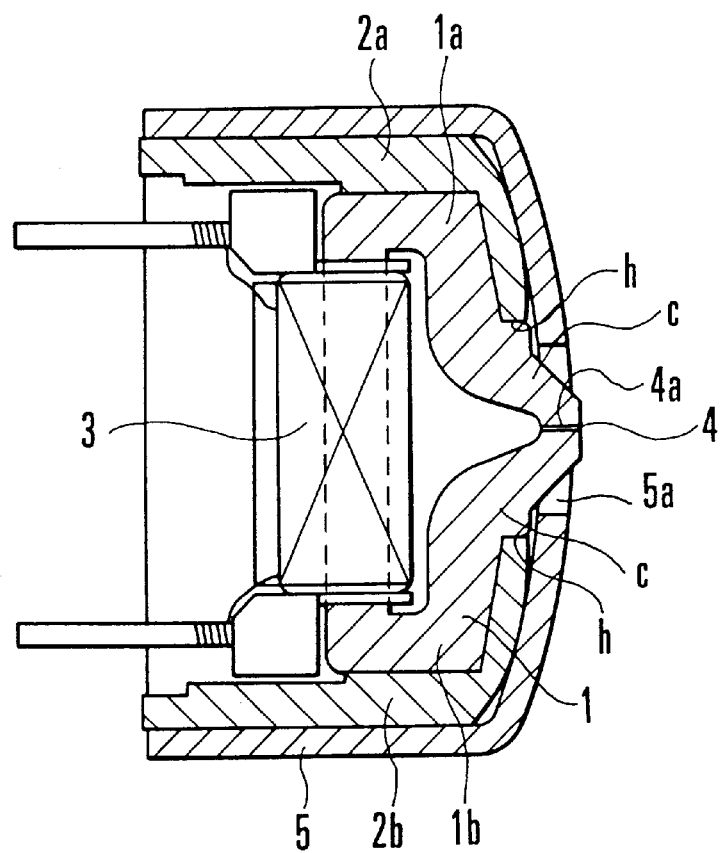
FIG. 6 is a diagrammatic, cross-sectional view showing a magnetic head which is an improved version of the magnetic head shown in FIG. 2.

A further embodiment which is an improved version of the above-described embodiment will be described below with reference to FIG. 6. FIG. 6 is a diagrammatic, cross-sectional view showing the further embodiment. In FIG. 6, identical reference numerals are used to denote constituent elements having functions identical to or corresponding to those of the above-described ones, and the description thereof is omitted.

In the further embodiment, the magnetic core halves 1a and 1b respectively have projecting portions "c" to be butted against each other at the magnetic gap portion 4, as in the case of the previously-described embodiment, and a step "h" is formed on each of the bases of the projecting portions "c" so as to be positioned on the inside of the portion of the shielding case 5 that faces the magnetic recording medium. The abutment ends of the core holders 2a and 2b abut the steps "h" of the magnetic core halves 1a and 1b, respectively.

Specifically, the outside surface portion of each of the magnetic core halves 1a and 1b, which extends toward the magnetic gap portion 4 from a portion facing the inside of the portion of the shielding case 5 that faces the magnetic recording medium and covers the magnetic core 1, is formed as the projecting portion "c" by a flat face. The magnetic core halves 1a and 1b are butted against each other with the non-magnetic spacer 4a inserted between their butt ends.

The projecting shape formed by the projecting portions "c" of the magnetic core 1 is not limited to the above-described approximately triangular shape in cross section. By forming the projecting shape into a shape such as that used in the previously-described embodiment, i.e., a shape other than the conventional, arcuate projecting cross-sectional shape having a large width, the open area of the opening 5a to be formed in the shielding case 5 to expose the magnetic gap portion 4 to the outside can be made smaller than the open area of the opening 5a required in the conventional magnetic head. For example, the width of the open area can be made smaller than 4 mm.

The respective abutment ends of the core holders 2a and 2b which hold and fix the magnetic core halves 1a and 1b in the shielding case 5 abut the corresponding steps "h" formed on the bases of the projecting portions "c" of the magnetic core halves 1a and 1b, thereby preventing the magnetic gap portion 4 from being deformed.

FIGS. 7(a) to 7(e) are explanatory views showing the outline of the process of producing the above-described embodiment.

Figure 7A:
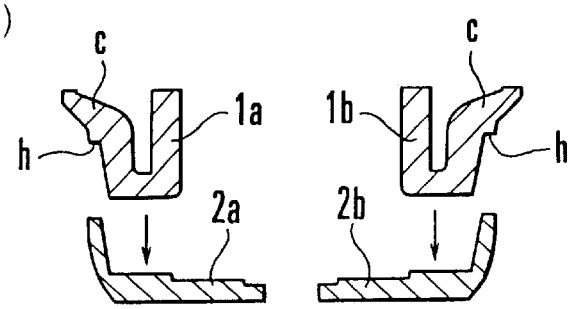
FIGS. 7(a) to 7(e) are explanatory views showing the outline of the process of producing the magnetic head shown in FIG. 6.
Figure 7B:
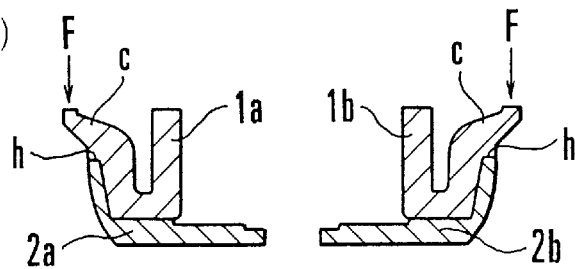

First, each of the magnetic cores 1a and 1b is formed by laminating a plurality of materials each having the step "h" and the projecting portion "c" which extends at an acute angle toward a portion which forms part of the magnetic gap portion 4, as shown in FIG. 7(a). Then, the respective abutment ends of the core holders 2a and 2b are brought into abutment with the steps "h" formed on the bases of the projecting portions "c", and fixed in that state by adhesion. Then, as shown in FIG. 7(b), the portions of the magnetic core halves 1a and 1b which form part of the magnetic gap portion 4 (i.e., the butt ends of the respective projecting portions "c") are each finished to have a predetermined precise shape.

Figure 7C:
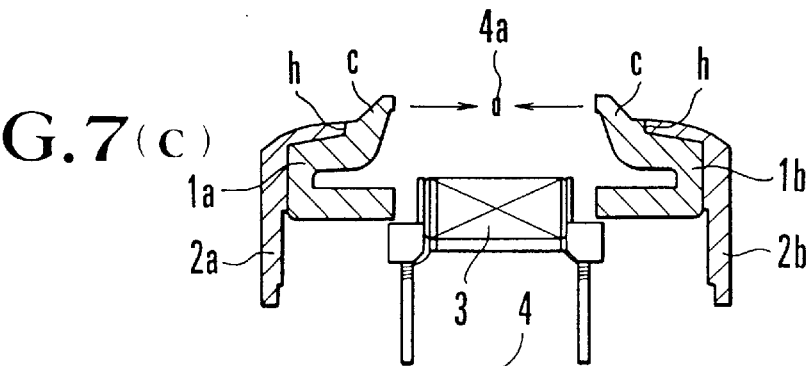
Figure 7D:
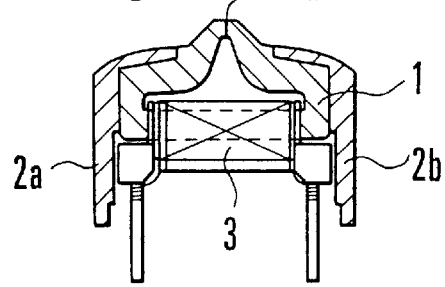

In the step shown in FIG. 7(c), the non-magnetic spacer 4a is inserted into the opposed ends of the magnetic core halves 1a and 1b on the side on which the magnetic gap portion 4 is to be formed, while the coil assembly 3 is inserted between the other opposed ends of the magnetic core halves 1a and 1b on the side on which the coil assembly 3 is to be fitted. Then, as shown in FIG. 7(d), the magnetic core halves 1a and 1b are integrally joined to form the magnetic core 1.

Figure 7E:
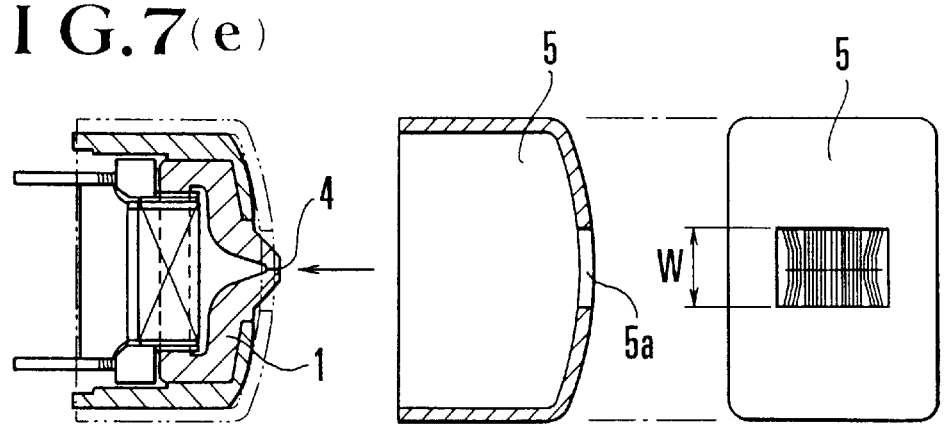

In the step shown in FIG. 7(e), the magnetic core 1 which is assembled in the aforesaid step is covered with the shielding case 5 and fixed by resin molding, and the magnetic head is completed by finishing a surface for sliding contact with a tape which serves as a recording medium.

According to the above-described embodiment, the respective abutment ends of the core holders 2a and 2b are fixed by adhesion in abutment with the steps "h" formed on the bases of the projecting portions "c", and the portions of the magnetic core halves 1a and 1b which form part of the magnetic gap portion 4 (i.e., the butt ends of the respective projecting portions "c") are each finished to have a predetermined precise shape. Accordingly, even if the projecting portions "c" of the magnetic core 1 are thin in cross-sectional view and the distance between the finished portion and the base of each of the projecting portions "c" is long, since the abutment ends of the core holders 2a and 2b are brought into abutment with the respective steps "h", the magnetic core halves 1a and 1b can be prevented from being elastically deformed by finishing loads F applied to the butt ends of the projecting portions "c" during finishing. Accordingly, the precision of the magnetic gap portion 4 is improved and the improved precision can be maintained.

In the above-described embodiment, it is possible to reduce the size of the opening required to be formed in the slide face of the shielding case, and it is also possible to greatly reduce external induced noise. However, in the electronically advanced modern society, there are many noise sources around a magnetic head. Accordingly, it is further necessary to cope with such many noise sources from which the magnetic core may not be completely isolated by only the aforesaid shielding case.

Another embodiment which will be described later has been made in light of the above-described point.

Figure 8A:
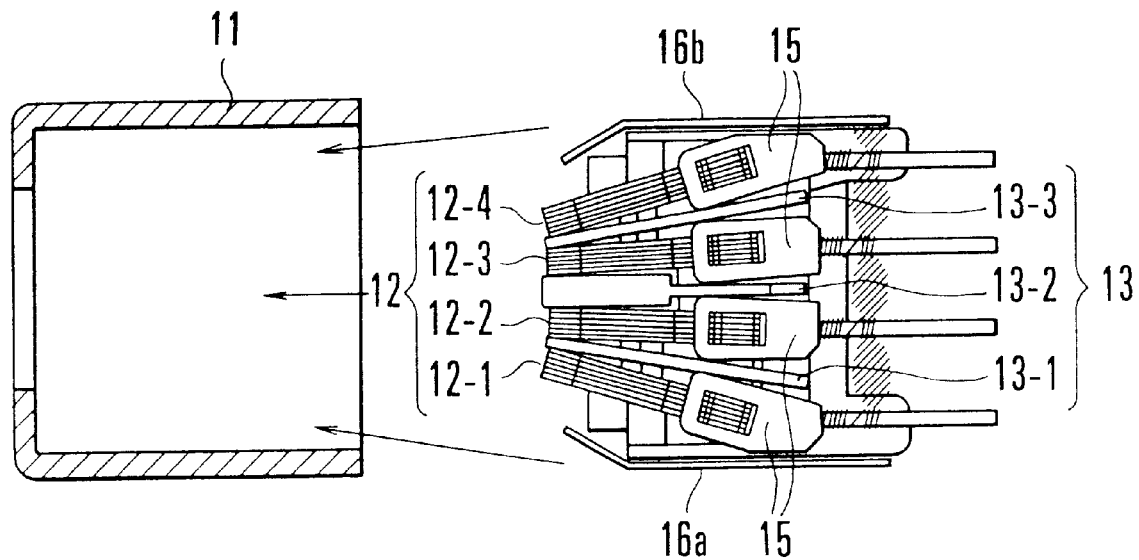
FIGS. 8(a) and 8(b) are partly cross-sectional views showing different sides of another embodiment of a magnetic head which is an improved version based on another aspect.
Figure 8B:
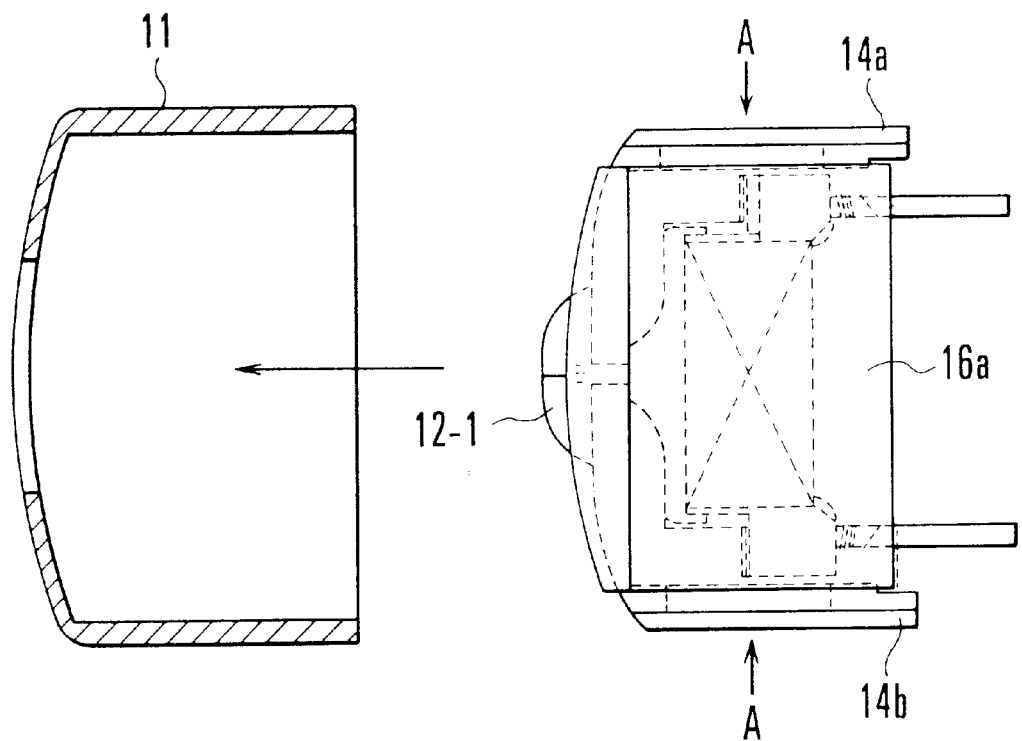

FIGS. 8(a) and 8(b) are partly cross-sectional views showing different sides of the embodiment which is improved as will be described below. The embodiment shown in FIGS. 8(a) and 8(b) includes a shielding case 11 for preventing external noise, a magnetic core 12 provided with four core pieces 12-1, 12-2, 12-3 and 12-4 for forming a magnetic circuit, a magnetic screening plate group 13 provided with magnetic screening plates 13-1, 13-2 and 13-3 for preventing magnetic leakage, the magnetic screening plates 13-1, 13-2 and 13-3 being respectively disposed between the core pieces 12-1 and 12-2; 12-2 and 12-3; 12-3 and 12-4, core holders 14a and 14b for fixedly holding the magnetic core 12 and the magnetic screening plate group 13, respectively, and bobbins 15 each having a coil winding for converting a magnetic flux passing through the magnetic circuit into an electric current, the bobbins 15 being respectively inserted into the core pieces 12-1, 12-2, 12-3 and 12-4. The embodiment shown in FIGS. 8(a) and 8(b) also includes magnetic shielding plates 16a and 16b for preventing external noise from entering the magnetic core 12, and the magnetic shielding plates 16a and 16b are formed of Permalloy and are respectively disposed between one side of the shielding case 11 and the adjacent, outermost core piece 12-1 and between the other side of the shielding case 11 and the adjacent, outermost core piece 12-4. The magnetic shielding plates 16a and 16b are fixed to the core holders 14a and 14b, as by welding or adhesion, similarly to the magnetic core 12. Holes (not shown) may respectively be formed in the magnetic shielding plates 16a and 16b, while projections (not shown) may respectively be formed on the core holders 14a and 14b, so that the respective projections can be fixedly fitted into the holes. In assembly, the aforesaid members excluding the shielding case 11 are assembled into an integral unit, and the integral unit is accommodated into the shielding case 11 as shown by arrows in FIGS. 8(a) and 8(b).

The head in which the coils wound around the respective bobbins 15 are disposed at the bottom of the magnetic core 12 as shown in FIG. 8(a), i.e., what is called "back-winding head", is susceptible to noise due to a magnetic field occurring in the direction indicated by A—A in FIG. 8(b) (along the axis of each of the bobbins 15). However, since the core pieces 12-1 and 12-3 as well as the magnetic screening plates 13-1 and 13-2 are disposed on the opposite sides of the inside core piece 12-2, the influence of noise on the core piece 12-2 is smaller than that of noise on either of the outermost core pieces 12-1 or 12-4. Similarly, since the core pieces 12-2 and 12-4 as well as the magnetic screening plates 13-2 and 13-3 are disposed on the opposite sides of the core piece 12-3, the influence of noise on the core piece 12-3 is smaller than that of noise on either of the outermost core pieces 12-1 or 12-4.

In addition, in the present embodiment, to prevent noise from entering the outermost core piece 12-1 or 12-4, the magnetic shielding plates 16a and 16b are respectively disposed between one side of the shielding case 11 and the adjacent, outermost core piece 12-1 and between the other side of the shielding case 11 and the adjacent, outermost core piece 12-4, as described above. This arrangement cooperates with the magnetic screening plates 13-1 and 13-3 in conducting noise which tends to enter the outermost core pieces 12-1 and 12-4 to the respective magnetic shielding plates 16a and 16b, thereby preventing noise from entering the outermost core pieces 12-1 and 12-4. Incidentally, in the present embodiment, the magnetic screening plates 13-1, 13-2 and 13-3 and the magnetic shielding plates 16a and 16b are formed to project outwardly from the core pieces 12-1, 12-2, 12-3 and 12-4 in the direction of A—A in FIG. 8(b), so that noise can easily be conducted toward the magnetic screening plate group 13 and the magnetic shielding plates 16a and 16b.

FIG. 9 is a diagram showing external-induced-noise frequency data about an example in which a magnetic head having the above-described arrangement was applied to a four-channel reproducing head. As can be seen from the result shown in FIG. 9, an improvement effect can be observed over a wide frequency band of 31.5 Hz to 10 kHz which was used for this measurement, and it is possible to obtain a great improvement effect in a frequency band of, particularly 1 kHz or higher which tends to cause an auditory problem. More specifically, in a frequency band of 2 kHz or higher, the difference between noise at the outside channels and noise at the inside channels is reduced to approximately ½ compared to the conventional head.

In the present embodiment, the magnetic shielding plates 16a and 16b are disposed as two separate elements between the shielding case 11 and the outermost core pieces 12-1 and 12-4 in light of the direction in which noise enters, cost, and the like. However, by integrally forming such magnetic shielding plates, it is possible to improve the shielding characteristics of the magnetic head to a further extent. Incidentally, the two magnetic shielding plates may be integrated in such a way that their arbitrary portions are joined to each other.

One integrating method is to join the magnetic shielding plates 16a and 16b to each other via portions 16c and 16d which are provided for contact with the inside of the tape running face of the shielding case 11, as shown in FIG. 10(a) in another arrangement, as shown in FIG. 10(b), holes 16f are formed in a terminal-inserting portion 16e so that individual terminals can be inserted through the holes 16f, and the magnetic shielding plates 16a and 16b are joined to each other via the terminal-inserting portion 16e. If such a joining arrangement using the terminal-inserting portion 16e is adopted, it is possible to greatly reduce the influence of noise from the back of the magnetic head, so that the induced-noise characteristics can be improved to a further extent by approximately 3 dB.

As shown in FIG. 10(c), the magnetic shielding plates 16a and 16b may be formed into the shape of covering both sides of the magnetic head. The arrangements shown in FIGS. 10(b) and 10(c) may also be combined as shown in FIG. 10(d).

Further, as shown in FIG. 10(e), a magnetic shielding plate 16 may be prepared which has a shape similar to the shielding case 11 (refer to FIGS. 8(a) and 8(b)) and a size which enables the magnetic shielding plate 16 to be intimately fitted into the shielding case 11. According to the arrangement shown in FIG. 10(e), since magnetic shielding plates are disposed on all sides other than the back, a highest noise shielding effect can be achieved.

In addition, the magnetic shielding plates 16a and 16b may have a laminated structure in which a plurality of magnetic materials of the same kind are laminated or a magnetic material and a non-magnetic material are laminated, as shown in FIG. 10(f) in the form of magnetic shielding plates 16a-1 and 16a-2 and magnetic shielding plates 16b-1 and 16b-2. According to the arrangement shown in FIG. 10(f), the high-frequency characteristics of noise shielding are improved so that it is possible to provide excellent induced noise characteristics for high-frequency noise.

In addition, as shown in FIGS. 10(g) and 10(h), the magnetic shielding plates 16a and 16b may be partly extended so that the extended portions can be inserted through a terminal-inserting portion as grounding terminals 17a and 17b. According to this structure, it is possible to eliminate a grounding terminal which has heretofore been required as a separate component, whereby it is possible to provide an inexpensive magnetic head having excellent noise characteristics.

In the present embodiment, the front edge portion of each of the magnetic shielding plates 16a and 16b is bent at a small angle to prevent entrance of noise along a bend and to take into account the entire shape of the shielding case 11 or the like. However, the front edge portion need not necessarily be formed into such a curved shape.

The magnetic shielding plates may be mounted, as by a method of bonding them to the core holders, a method of fixing them to the core holders by fitting, or a method of fixing them to the shielding case by welding in advance.

As shown in FIG. 10(i), elastic portions 18a and 18b may also be formed on the magnetic shielding plates 16a and 16b so that the magnetic shielding plates 16a and 16b can be inserted into the shielding case 11 (refer to FIGS. 8(a) and 8(b)) without the use of a leaf spring for pressing the core holders against the shielding case. This structure offers a further cost reduction.

A most general material for the magnetic shielding plates is the aforementioned Permalloy. However, a similar noise reduction effect can be achieved by using a material, such as amorphous alloy, ferrite or Sendust, which is identical to the material of the magnetic core or the magnetic screening plates.

As is apparent from the foregoing description, according to the arrangement of the above-described embodiment, since the respective magnetic shielding plates are disposed between the outermost core pieces and the corresponding sides of the shielding case, it is possible to greatly reduce the amount in which external induced noise enters the magnetic core.

By way of example, the above-described embodiment is applied to the magnetic head of the conventional type in which the magnetic core has an arcuate, projecting external shape in cross section. However, if the above-described embodiment is applied to the other embodiment described previously, it is possible to achieve a further magneticshielding effect.

What is claimed is:

1. A magnetic head comprising:
    (a) a plurality of magnetic core pieces arranged one after the other in respective adjacent disposition along a first direction, said core pieces being wound with a coil;
    (b) first magnetic shielding members disposed individually between adjacent ones of said plurality of magnetic core pieces;
    (c) a shielding case in which said plurality of magnetic core pieces and said first magnetic shielding members are accommodated; and
    (d) second magnetic shielding members respectively disposed only between one interior side of said shielding case and a magnetic core piece adjacent said one interior side and only between an opposite interior side of said shielding case and a magnetic core piece adjacent to said opposite interior side, said one interior side and said opposite interior side each being arranged along said first direction.

2. A magnetic head according to claim 1, wherein said shielding case has a side defining a sliding face for sliding contact with a magnetic recording medium and wherein said second magnetic shielding members are joined to each other on said shielding case side.

3. A magnetic head according to claim 1 or 2, wherein said second shielding members partly project from said shielding case.

4. A magnetic head according to claim 1, wherein said second shielding members have a shape substantially equal to a share of said shielding case, outside faces of said second shielding members being substantially in abutment with inside faces of said shielding case.

5. A magnetic head according to claim 1, wherein each of said second shielding members is is comprised of a laminate of a plurality of shielding elements.

6. A magnetic head comprising:
    (a) a plurality of magnetic core pieces arranged one after the other in respective adjacent disposition along a first direction;
    (b) first magnetic shielding members disposed individually between adjacent ones of said plurality of magnetic core pieces;

(c) a shielding case in which said plurality of magnetic core pieces and said first magnetic shielding members are accommodated;

(d) second magnetic shielding members respectively disposed between one interior side of said shielding case and a magnetic core piece adjacent said one interior side and between an opposite interior side of said shielding case and a magnetic core piece adjacent to said opposite interior side, said one interior side and said opposite interior side each being arranged along said first direction; and (e) coil bobbins with respective terminals projecting outwardly of an exterior side of said shielding case, said bobbins respectively fitted to said plurality of magnetic core pieces, said second shielding members being joined to each other on said exterior side.

* * * * *

UNITED STATES PATENT AND TRADEMARK OFFICE
CERTIFICATE OF CORRECTION

PATENT NO. : 5,949,628
DATED : September 7, 1999
INVENTOR(S) : Koji Noboryu, et al.

It is certified that error appears in the above-identified patent and that said Letters Patent are hereby corrected as shown below:

Abstract, line 9, delete "incross" and insert -- in cross --.
Col. 10, line 54, delete "share" and insert -- shape --.

Signed and Sealed this

Third Day of April, 2001

Attest:

NICHOLAS P. GODICI

Attesting Officer

Acting Director of the United States Patent and Trademark Office